Feb. 23, 1932.　　　　R. P. KETCHAM　　　1,846,734
AUTOMOBILE BRAKE TESTER
Filed Sept. 15, 1928
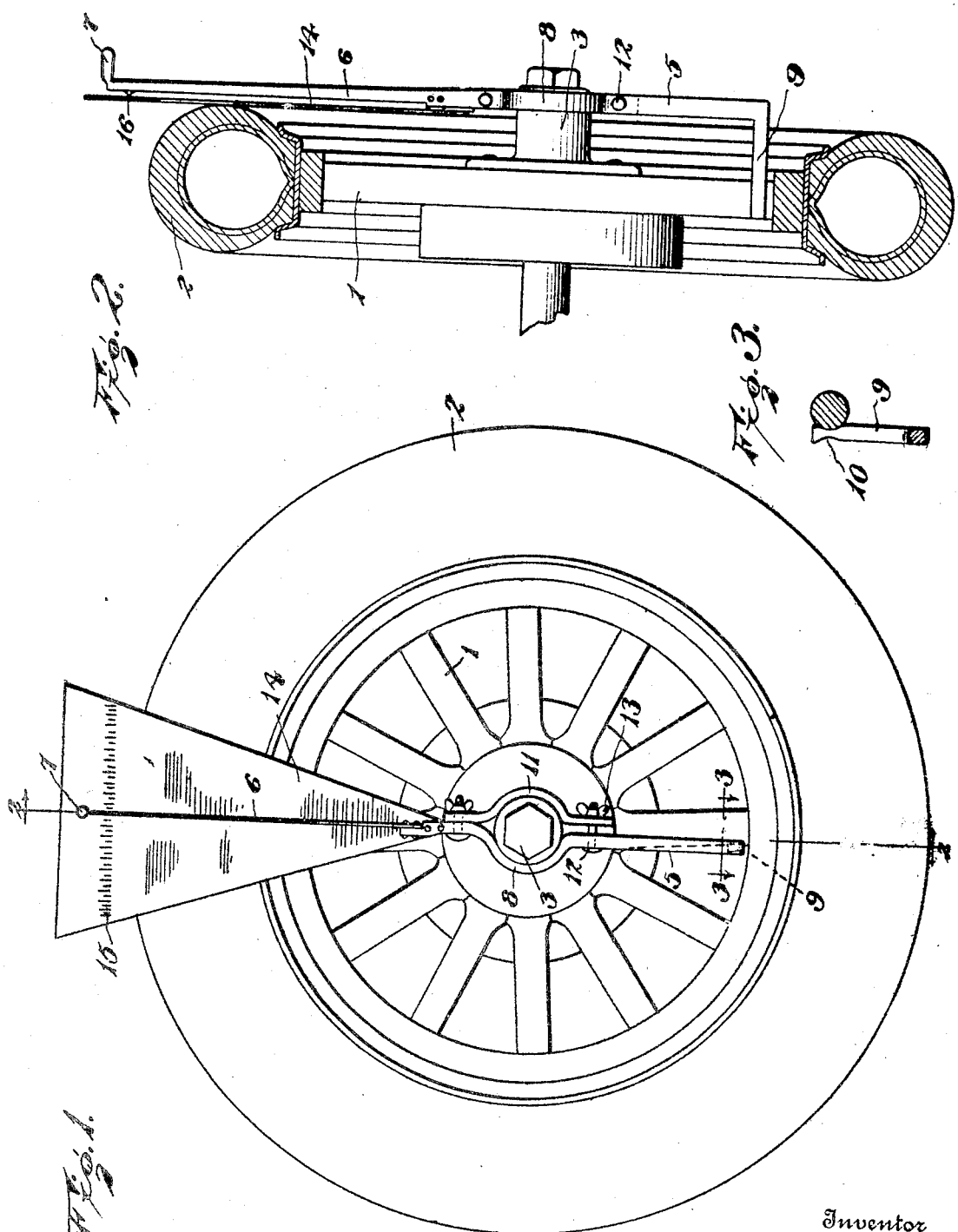
Inventor
Ralph P. Ketcham
By Lacey & Lacey, Attorneys Patented Feb. 23, 1932

1,846,734

UNITED STATES PATENT OFFICE

RALPH P. KETCHAM, OF BLOOMINGTON, INDIANA

AUTOMOBILE BRAKE TESTER

Application filed September 15, 1928. Serial No. 306,207.

This invention relates to an improved brake tester and seeks, among other objects, to provide a device for engaging a vehicle wheel and exerting a turning force thereupon sufficient to overcome the holding effect of the brake strap on the drum of said wheel when the pedal is in a predetermined brake applying position.

Another object of the invention is to provide a brake tester which is adjustable for use with drum carrying wheel hubs of various sizes.

A further object of the invention is to provide a brake tester having a gauge for indicating the force required to rotate the wheel at a given pressure on the brake pedal and thus providing means for adjusting the brakes to uniform setting.

Other objects of the invention not specifically mentioned in the foregoing will be apparent during the course of the following description.

In the drawings:

Figure 1 is a side elevation of the device showing it in position on an automobile wheel, Figure 2 is a view showing a wheel in section and an elevation of the device in position on the wheel, Figure 3 is a fragmentary sectional view taken on the line 3—3 of Figure 1 looking in the direction indicated by the arrows.

Referring now more particularly to the drawings, the numeral 1 indicates an automobile wheel having a tire 2 and provided with a hub 3.

In carrying the invention into effect, I employ a lever which includes a rigid lower portion 5 and riveted or otherwise secured to the upper end of the lower portion of the lever is a spring 6 which forms the flexible upper portion of the lever, the spring being tapered in thickness toward its upper end and provided with an outwardly extending handle 7. The portion 5 of the lever is bowed to provide one half of a collar 8, and formed on the lower end portion of the lever at its lower end is an inwardly projecting arm 9 having concave spoke seats 10 formed in the edges thereof.

Associated with the portion 5 of the lever and disposed to cooperate with the bowed portion thereof is a bowed strap 11 forming the other half of the collar 8, and extending through the portion 5 and through the ends of the strap are bolts 12 provided with wing nuts 13.

Riveted or otherwise secured to the lower portion of the lever near the base end of the spring 6 is a plate 14 substantially triangular in shape and having a scale 15 imposed transversely upon its outer face near the upper edge thereof. Formed on the spring 6 near the upper end thereof and disposed inwardly is a pointer 16 to cooperate with the scale 15.

When it is desired to determine the amount of force required to rotate the brake carrying wheel at a given pressure on the foot pedal, the wheel to be tested is first jacked clear of the ground. The device is then placed in position on the wheel with the collar 8 fitting about the hub and the arm 9 engaging a spoke of said wheel. The brake pedal is depressed to the brake setting position before the testing operation is effected. The handle 7 is then grasped and swung to one side until the wheel begins to rotate, the spring 6 being, of course, coincidently flexed by the force exerted on the handle. Accordingly, the pointer 16 will be shifted to indicate on the scale 15, the force required to rotate the wheel so that the same operation may be performed on the other brake carrying wheels of the car and a uniform brake setting effected.

Having thus described the invention, I claim:

1. A brake testing device including a lever having a flexible portion, means carried by the lever to engage a wheel whereby the lever may be swung for rotating the wheel, and a plate carried by the lever, said plate remaining stationary while the lever is swung and the plate having a scale for indicating the force required to rotate the wheel when said portion of the lever is flexed.

2. A brake testing device including a lever, a collar carried by the lever and adjustable to fit about wheel hubs of different diameters, means cooperating with said collar and adapted to engage a portion of the wheel remote from the hub whereby the lever may be swung for rotating the wheel, and means for indicating the force required to turn said wheel.

3. A brake testing device including a lever having a flexible portion and a rigid portion provided with an arm to engage a spoke of a wheel, a collar carried by the rigid portion of the lever to fit about the wheel hub whereby the lever may be swung for rotating the wheel, and means fixed on the rigid portion for indicating the travel of the flexible portion of the lever when such portion is flexed.

In testimony whereof I affix my signature.

RALPH P. KETCHAM. [L. S.]